(12) United States Patent
Hsu

(10) Patent No.: US 12,719,987 B2
(45) Date of Patent: Aug. 25, 2026

(54) INTERNET TELEPHONE SYSTEM, PRIVATE BRANCH EXCHANGE DEVICE AND CUSTOMER SERVICE SCHEDULING METHOD

(71) Applicant: Acer Incorporated, New Taipei City (TW)

(72) Inventor: Wen-Cheng Hsu, New Taipei City (TW)

(73) Assignee: ACER INCORPORATED, New Taipei City (TW)

( * ) Notice: Subject to any disclaimer, the term of this patent is extended or adjusted under 35 U.S.C. 154(b) by 261 days.

(21) Appl. No.: 18/773,198

(22) Filed: Jul. 15, 2024

(65) Prior Publication Data

US 2025/0240368 A1 Jul. 24, 2025

(30) Foreign Application Priority Data

Jan. 18, 2024 (TW) ................................ 113102033

(51) Int. Cl.

| | |
|---|---|
| ***H04M 3/523*** | (2006.01) |
| ***H04L 65/1055*** | (2022.01) |
| ***H04L 65/1104*** | (2022.01) |
| ***H04M 3/51*** | (2006.01) |
| ***H04M 7/00*** | (2006.01) |

(52) U.S. Cl.
CPC ...... *H04M 3/5231* (2013.01); *H04L 65/1055* (2022.05); *H04L 65/1104* (2022.05); *H04M 3/5166* (2013.01); *H04M 7/003* (2013.01); *H04M 7/009* (2013.01)

(58) Field of Classification Search
CPC .. H04M 3/5231; H04M 3/5166; H04M 7/003; H04M 7/009; H04L 65/1104; H04L 65/1055
USPC ........................................................ 379/88.01
See application file for complete search history.

(56) References Cited

U.S. PATENT DOCUMENTS 6,751,211 B1 * 6/2004 Chack ..................... H04L 67/53 370/352
7,899,168 B2 * 3/2011 Raghav ............... H04L 65/1104 379/207.02
8,401,163 B1 * 3/2013 Kirchhoff ........... H04L 65/1045 455/414.1

(Continued)

FOREIGN PATENT DOCUMENTS

CN 101262523 A 9/2008

*Primary Examiner* — Binh Kien Tieu
(74) *Attorney, Agent, or Firm* — Birch, Stewart, Kolasch & Birch, LLP

(57) ABSTRACT

An internet telephone system, a private branch exchange device (PBX device) and a customer service scheduling method are provided. The internet telephone system includes a user device, a PBX device and at least one service extension. The user device includes a processing unit and a transmission unit. The PBX device includes a communication unit, an interactive voice response unit, a control unit and a distribution unit. In a call accessing procedure, the processing unit of the user device sets a push token into a first SIP header of a first session initiation protocol message (SIP message). If the service extension is busy, the control unit of the PBX device records the push token and the service extension to a scheduled call of a queue list and records a scheduling status of the scheduled call as "pending".

20 Claims, 8 Drawing Sheets

QTB

| | PT | 700i | ST | PC | ET |
|---|---|---|---|---|---|
| | Token | Extension | Status | Pin code | Expired time |
| SCj | 3ed3d | 3423 | pending | | |
| | | | | | |

⋮

(56) References Cited

U.S. PATENT DOCUMENTS

| | | | | |
|---|---|---|---|---|
| 8,472,612 | B1 * | 6/2013 | Goringe | H04M 3/42187 379/266.01 |
| 10,581,829 | B1 * | 3/2020 | Don | H04L 65/403 |
| 2001/0021948 | A1 * | 9/2001 | Khouri | H04M 7/003 709/218 |
| 2007/0191040 | A1 * | 8/2007 | Kadar | H04W 24/00 455/466 |
| 2010/0067683 | A1 | 3/2010 | Goode | |
| 2011/0164744 | A1 | 7/2011 | Olshansky et al. | |

* cited by examiner

| Token | Extension | Status | Pin code | Expired time |
|---|---|---|---|---|
| 3ed3d | 3423 | pending | | |
| | | | | |

PT 700i ST PC ET

| | Token | Extension | Status | Pin code | Expired time |
|---|---|---|---|---|---|
| SCj | 3ed3d | 3423 | active | sddffw | 10:05 |

PT 700i ST PC ET

| Token | Extension | Status | Pin code | Expired time |
| --- | --- | --- | --- | --- |
| | | | | |

INTERNET TELEPHONE SYSTEM, PRIVATE BRANCH EXCHANGE DEVICE AND CUSTOMER SERVICE SCHEDULING METHOD

This application claims the benefit of Taiwan application Serial No. 113102033, filed Jan. 18, 2024, the subject matter of which is incorporated herein by reference.

BACKGROUND OF THE INVENTION

Field of the Invention

The invention relates in general to a processing method, a telephone system and a control method, and more particularly to an internet telephone system, a private branch exchange device and a customer service scheduling method.

Description of the Related Art

With the popularity of the network, people are getting more and more dependent on the Internet regardless shopping, gaming, or attending relevant business. Being so, the on-line customer service is gradually inclined to providing service using internet call. However, the customer service is often in a busy state, and the user have to spend a large amount of waiting time waiting. Therefore, it has become a prominent task for the industries to effectively use the resources of customer service and reduce the user's waiting time through the use of an internet telephone system.

SUMMARY OF THE INVENTION

The invention is directed to an internet telephone system, a private branch exchange device (PBX device) and a customer service scheduling method. Through the use of an automatic pushing mechanism, the user does not have to wait on-line. Instead, the user can contact the customer service after hanging up the call. Thus, the user can have better experience in contacting customer service.

According to one embodiment of the present invention, a customer service scheduling method for internet call is provided. The customer service scheduling method for internet call includes a call accessing procedure. The call accessing procedure includes: setting a push token into a first session initiation protocol header (SIP header) of a first session initiation protocol message (SIP message) by a user device; transmitting the first session SIP message to a private branch exchange device (PBX device) by the user device to place a call; directing the call to a service extension by the PBX device when receiving the first session SIP message; determining whether the service extension is busy by the PBX device; and if the service extension is busy, recording the push token and the service extension to a scheduled call of a queue list, and recording a scheduling status of the scheduled call as "pending" by the PBX device.

According to another embodiment of the present invention, an internet telephone system is provided. The internet telephone system includes a user device, a PBX device and at least one service extension. The user device includes a processing unit and a transmission unit. The transmission unit is connected to the processing unit. The PBX device includes a communication unit, an interactive voice response unit (IVR), a control unit and a distribution unit. The interactive voice response unit is connected to the communication unit. The control unit is connected to the communication unit and the interactive voice response unit. The distribution unit is connected to the control unit. In a call accessing procedure, the processing unit of the user device sets a push token into a first SIP header of a first session initiation protocol message (SIP message). The transmission unit of the user device transmits the first session SIP message to a PBX device to place a call. When the communication unit of the PBX device receives the first session SIP message, the interactive voice response unit of the PBX device directs the call to the service extension. The PBX device determines whether the service extension is busy. If the service extension is busy, the control unit of the PBX device records the push token and the service extension to a scheduled call of a queue list and records a scheduling status of the scheduled call as "pending".

According to an alternate embodiment of the present invention, a PBX device is provided. The PBX device includes a communication unit, an interactive voice response unit, a control unit and a distribution unit. The interactive voice response unit is connected to the communication unit. The control unit is connected to the communication unit and the interactive voice response unit. The distribution unit is connected to the control unit. In a call accessing procedure, a user device sets a push token into a first SIP header of a first session initiation protocol message (SIP message). The user device transmits the first session SIP message to a PBX device to place a call. When the communication unit of the PBX device receives the first session SIP message, the interactive voice response unit of the PBX device directs the call to a service extension. The PBX device determines whether the service extension is busy. If the service extension is busy, the control unit of the PBX device records the push token and the service extension to a scheduled call of a queue list and records a scheduling status of the scheduled call as "pending".

The above and other aspects of the invention will become better understood with regard to the following detailed description of the preferred but non-limiting embodiment(s). The following description is made with reference to the accompanying drawings.

DETAILED DESCRIPTION OF THE INVENTION

Technical terms are used in the specification with reference to the prior art used in the technology field. For any terms described or defined in the specification, the descriptions and definitions in the specification shall prevail. Each embodiment of the present disclosure has one or more technical features. Given that each embodiment is implementable, a person ordinarily skilled in the art can selectively implement or combine some or all of the technical features of any embodiment of the present disclosure.

Figure 1:
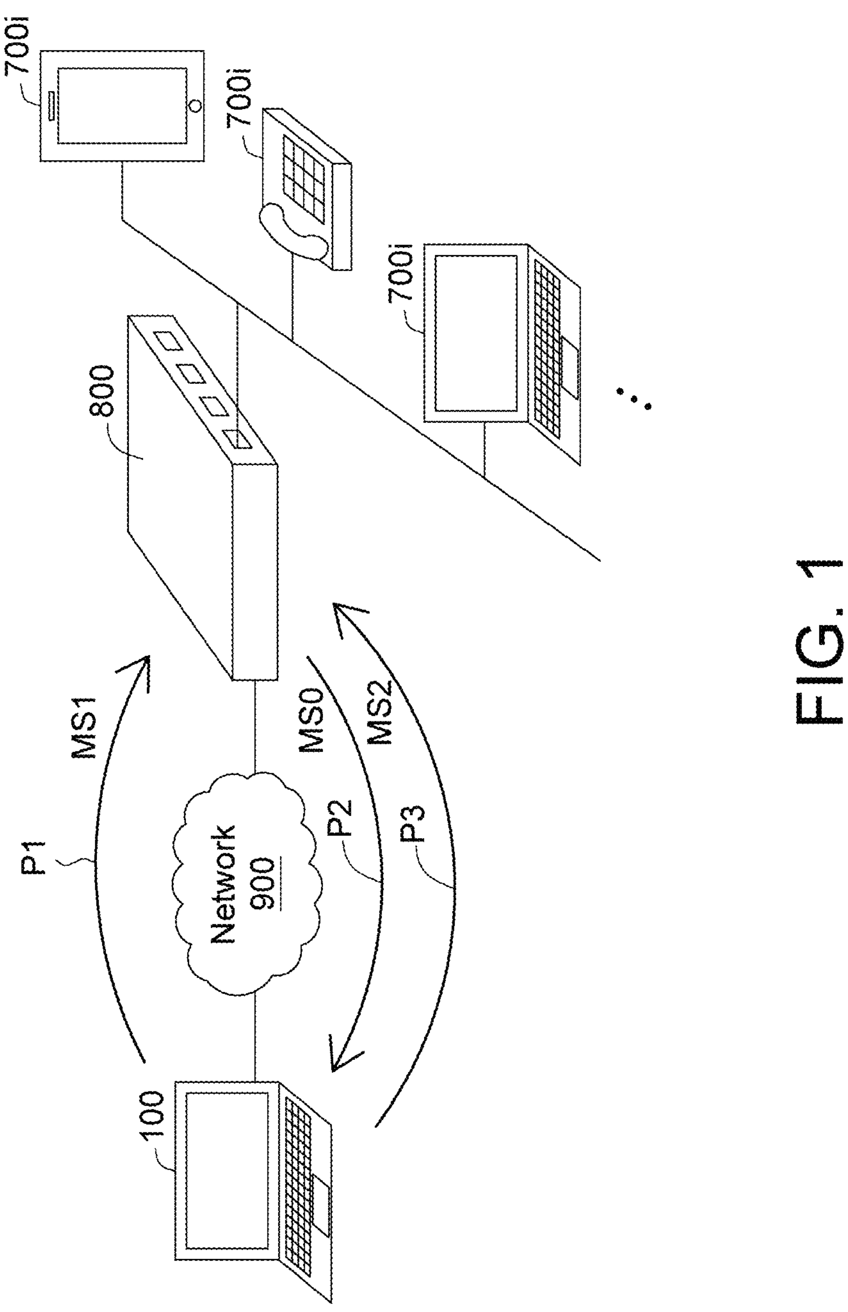
FIG. 1 is a schematic diagram of an internet telephone system according to an embodiment of the present disclosure.

Referring to FIG. 1, a schematic diagram 1000 of an internet telephone system according to an embodiment of the present disclosure is shown. In the present disclosure, the customer service scheduling method for internet call adopted by the internet telephone system 1000 includes a call accessing procedure P1, an automatic pushing procedure P2 and a callback procedure P3.

In the call accessing procedure P1, an internet call (that is, the first session SIP message MS1) is dialed to a PBX device 800 through the network 900 by a user using a user device 100, then the call is transmitted to a service extension **700*i* via the PBX device 800. If the service extension 700*i* is busy, the internet call will be automatically hanged up. If the service extension 700*i* is idle, the method proceeds to the automatic pushing procedure P2, a push message MS0 is sent to the user device 100 by the PBX device 800. Once the push message MS0 is received by the user, the method proceeds to the callback procedure P3, another internet call (that is, the second session SIP message MS2) is dialed to the PBX device 800 to have a direct call with the service extension 700*i***.

That is, when the service extension **700*i* is busy, the user does not need to wait on-line. When the user calls back to the service extension 700*i* after receiving the push message MS0**, the call will be answered. Thus, the user can save a large amount of waiting time.

Figure 2:
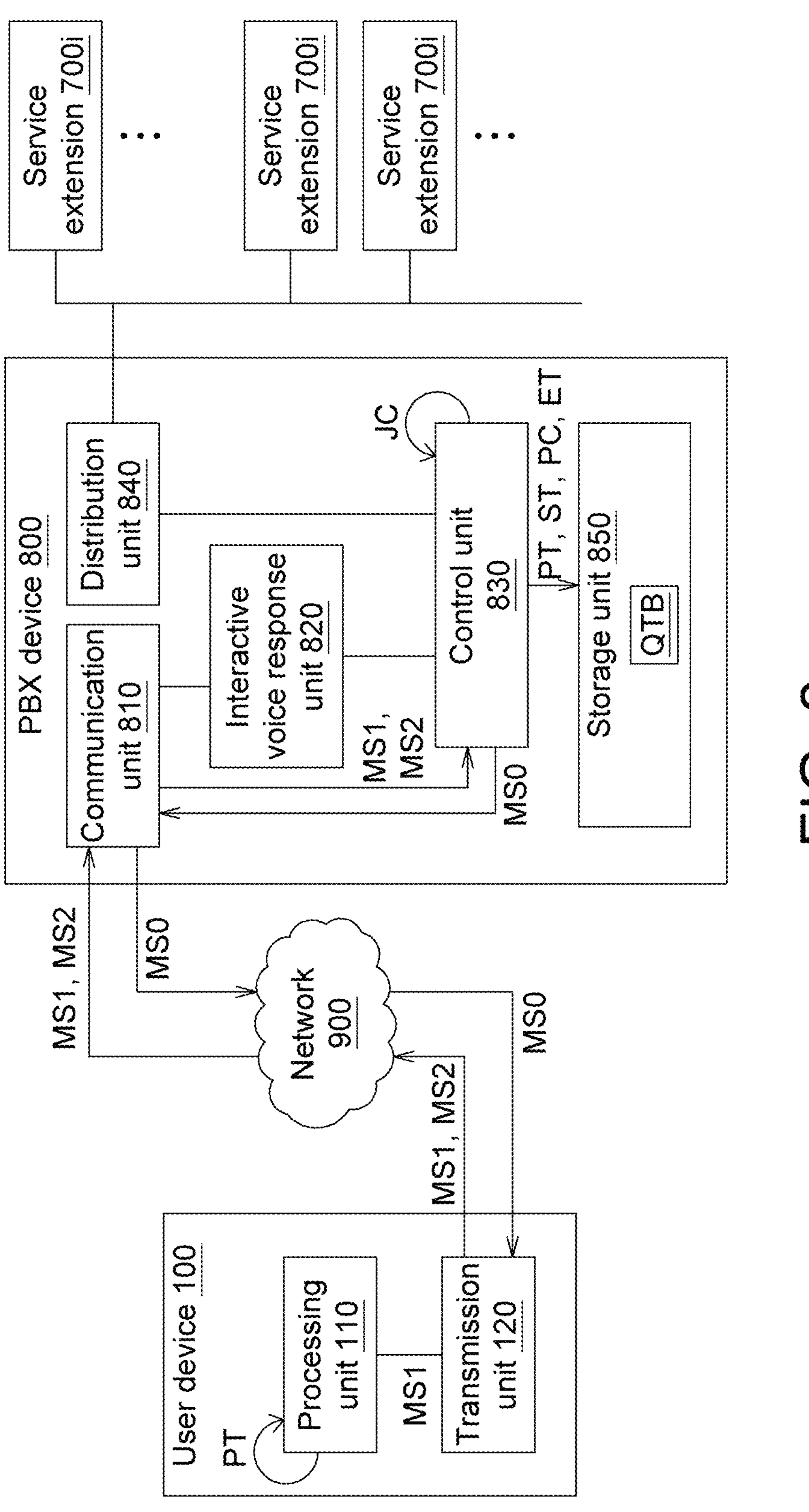
FIG. 2 is a block diagram of an internet telephone system according to an embodiment of the present disclosure.

Referring to FIG. 2, a block diagram of an internet telephone system 1000 according to an embodiment of the present disclosure is shown. The internet telephone system 1000 includes the said user device 100, the said PBX device 800 and the said service extension **700*i*. The user device 100 includes a processing unit 110 and a transmission unit 120. The transmission unit 120 is connected to the processing unit 110**.

The PBX device 800 includes a communication unit 810, an interactive voice response unit 820, a control unit 830, a distribution unit 840 and a storage unit 850. The interactive voice response unit 820 is connected to the communication unit 810. The control unit 830 is connected to the communication unit 810 and the interactive voice response unit 820. The distribution unit 840 is connected to the control unit 830.

The processing unit 110, the transmission unit 120, the communication unit 810, the interactive voice response unit 820, the control unit 830 and/or the distribution unit 840 can be realized by such as a circuit, a circuit board, a storage device for storing program code or a chip. The chip can be realized by such as a central processing unit (CPU), or other programmable or application specific micro control unit (MCU), microprocessor, digital signal processor (DSP), programmable controller, application specific integrated circuit (ASIC), graphics processing unit (GPU), image signal processor (ISP), image processing unit (IPU), arithmetic logic unit (ALU), complex programmable logic device (CPLD), field programmable gate array (FPGA) or other similar elements or a combination thereof.

The storage unit 850 is used for storing data and can be realized any type of fixed or movable random access memory (RAM), read-only memory (ROM), flash memory, hard disk drive (HDD), solid state drive (SSD) or similar element or a combination thereof for storing multiple modules performed by processor or various Apps.

In the present embodiment, when the PBX device 800 receives the internet call (that is, the first session SIP message MS1) of the user device 100, the said call accessing procedure P1 will be performed and the call will be allocated to the service extension **700*i* or recorded to a scheduled call SCj (illustrated in FIG. 5**) of a queue list QTB.

Figure 3:
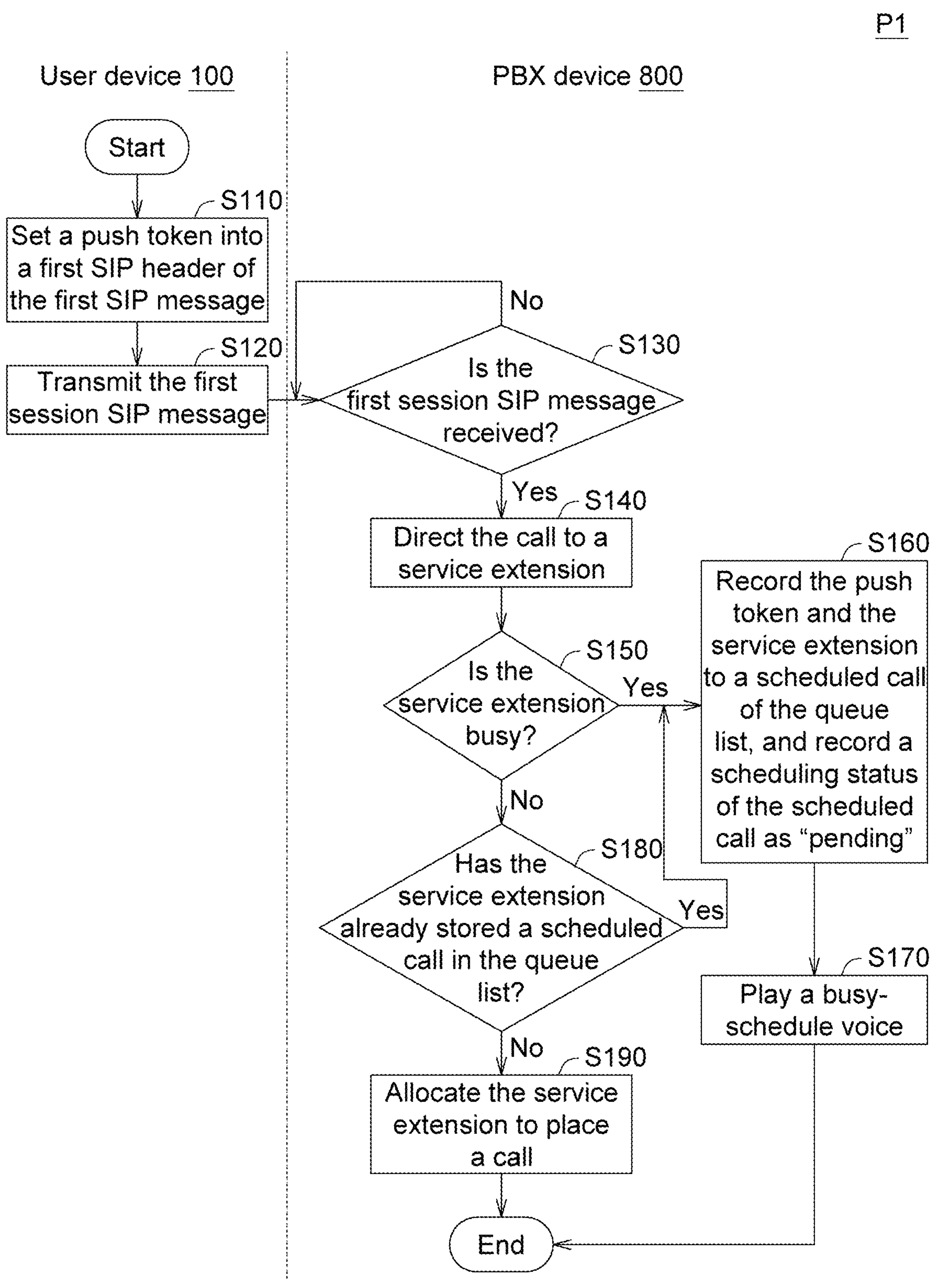
FIG. 3 is a flowchart of a call accessing procedure according to an embodiment of the present disclosure.
Figure 4:
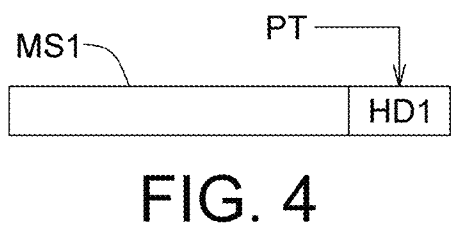
FIG. 4 exemplifies step S110.

Referring to FIG. 3, a flowchart of a call accessing procedure P1 according to an embodiment of the present disclosure is shown. The call accessing procedure P1 includes steps S110 to step S190. Referring to FIG. 4, step S110 is exemplified. In step S110, a push token PT is set into a first session initiation protocol header (SIP header) HD1 of the first session SIP message MS1 by the processing unit 110 of the user device 100.

When the user device 100 places an internet call, the user device 100 will record information (including device identification information and network location identification information) to the push token PT automatically marked in the first SIP header HD1 of the first session SIP message MS1.

Next, the method proceeds to step S120, the first session SIP message MS1 is transmitted to the PBX device 800 through the network 900 by the transmission unit 120 of the user device 100 to place a call.

Then, the method proceeds to step S130, whether the first session SIP message MS1 is received is determined by the communication unit 810 of the PBX device 800. If the first session SIP message MS1 is received from the user device 100, the method proceeds to step S140.

in step S140, the call is directed to a particular service extension **700*i* by the interactive voice response unit 820 of the PBX device 800**.

Next, the method proceeds to step S150, whether the service extension **700*i* is busy is determined by the control unit 830 of the PBX device 800. If the service extension 700*i* is not busy, the method proceeds to step S180. If the service extension 700*i* is busy, the method proceeds to step S160**.

Figure 5:
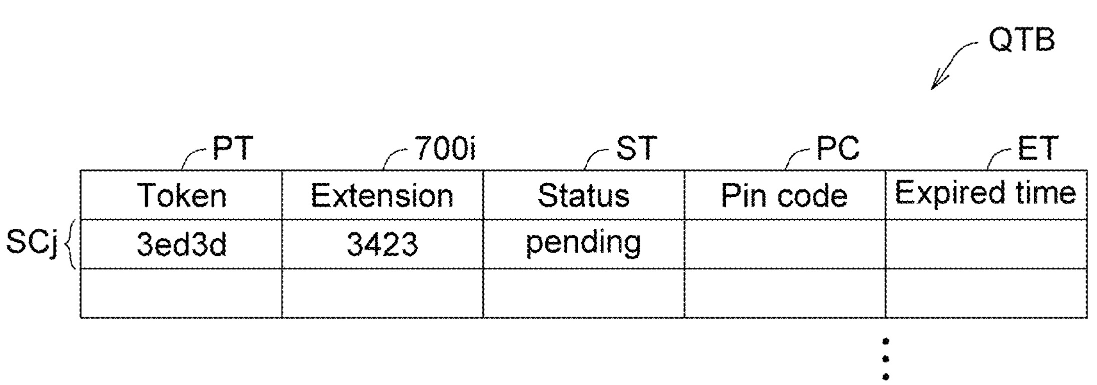
FIG. 5 exemplifies step S160.

Referring to FIG. 5, step S160 is exemplified. In step S160, the push token PT and the service extension **700*i* are recorded to a scheduled call SCj of the queue list QTB, and a scheduling status ST of the scheduled call SCj is recorded as "pending" by the control unit 830 of the PBX device 800**.

As indicated in FIG. 5, the queue list QTB records relevant information of the scheduled call SCj. For instance, the push token PT is recorded as "3ed3d", the service extension **700*i* is recorded as "3423", and the scheduling status ST is recorded as "pending". Based on the timing sequence of incoming calls, a number of scheduled calls SCj are sequentially recorded in the queue list QTB, and temporarily stored in the storage unit 850**.

Next, the method proceeds to step S170, a busy-schedule voice is played by the interactive voice response unit 820 of the PBX device 800, and the call is automatically hanged up. In the present step, the PBX device 800 automatically plays the voice, informs the user that the service extension **700*i* is currently busy, and informs the user to call back after receiving the push message MS0**; the call is hanged up in the wake of the above voice explanation.

In step S150, if the service extension **700*i* is not busy, the method proceeds to step S180. In step S180, whether the service extension 700*i* has already stored in a scheduled call SCj of the queue list QTB is determined by the control unit 830 of the PBX device 800. If the service extension 700*i* has already stored in a scheduled call SCj of the queue list QTB, the method proceeds to step S160. If the service extension 700*i* has not stored any scheduled call SCj in the queue list QTB, the method proceeds to step S190**.

In step S160, the push token PT and the service extension 700*i* are recorded to another scheduled call SCj of the queue list QTB, and the scheduling status ST of the scheduled call SCj is recorded as "pending" by the control unit 830 of the PBX device 800.

In step S190, the service extension 700*i* is allocated to place a call by the control unit 830 of the PBX device 800. Meanwhile, the service extension 700*i* is not busy and the queue list QTB does not have any scheduled call SCj corresponding to the service extension 700*i* that needs to be handled, therefore the service extension 700*i* can be allocated to place a call.

In the call accessing procedure P1, when the service extension 700*i* is busy, or the queue list QTB still has a scheduled call SCj corresponding to the service extension 700*i* that needs to be handled, the method proceeds to step S160 to add a scheduled call SCj to the queue list QTB. After the scheduled call SCj is recorded to the queue list QTB, the method proceeds to the automatic pushing procedure P2. In the automatic pushing procedure P2, if the service extension 700*i* is idle, a push message MS0 is automatically sent to the user device 100 to inform the user to call back.

Figure 6:
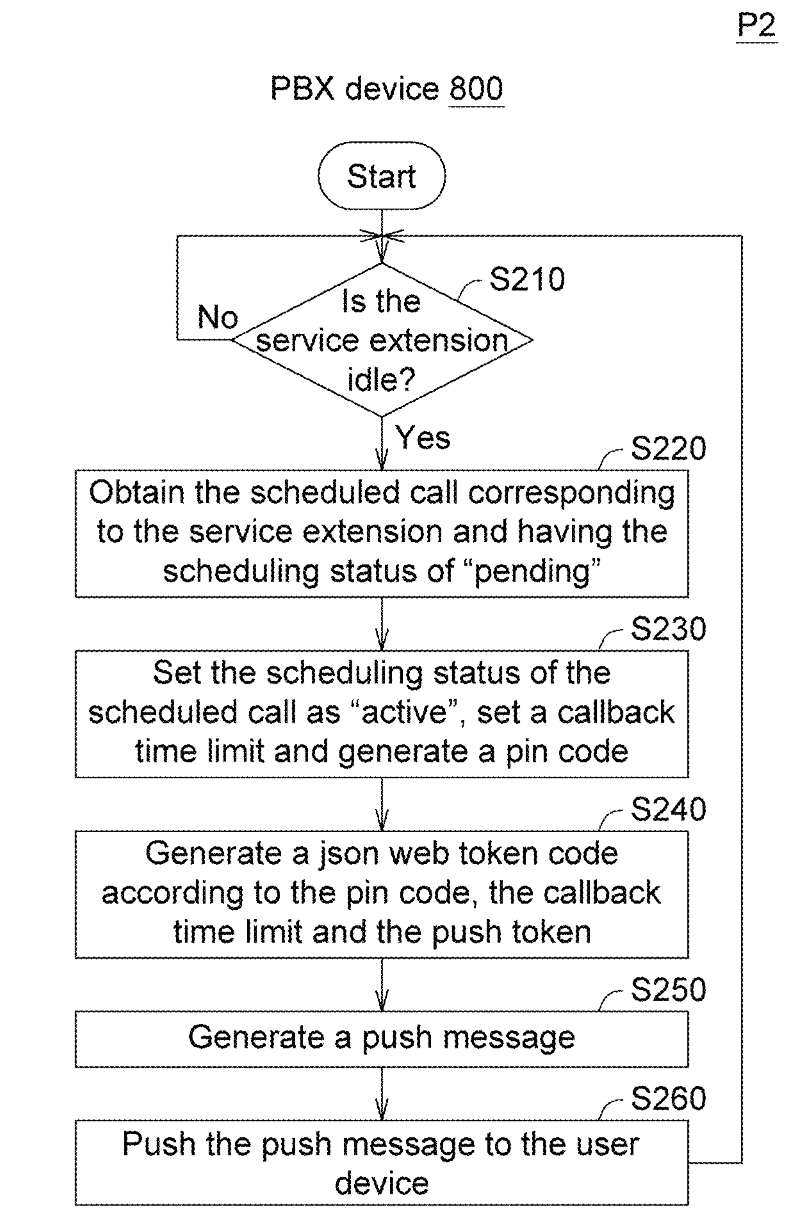
FIG. 6 is a flowchart of an automatic pushing procedure according to an embodiment of the present disclosure.

Referring to FIG. 6, a flowchart of an automatic pushing procedure P2 according to an embodiment of the present disclosure is shown. The automatic pushing procedure P2 includes step S210 to step S260. In step S210, whether the service extension 700*i* is idle is determined by the control unit 830 of the PBX device 800. If the service extension 700*i* is busy, the determination of step S210 is continued until the service extension 700*i* is idle, then the method proceeds to step S220.

In step S220, the scheduled call SCj corresponding to the service extension 700*i* and having the scheduling status ST of "pending" is obtained by the control unit 830 of the PBX device 800. Refer to FIG. 5. When the "3423" service extension 700*i* is idle, the control unit 830 will obtain the first priority scheduled call SCj having a "pending" status from the corresponding "3423" service extension 700*i*.

Figures 7, 8:
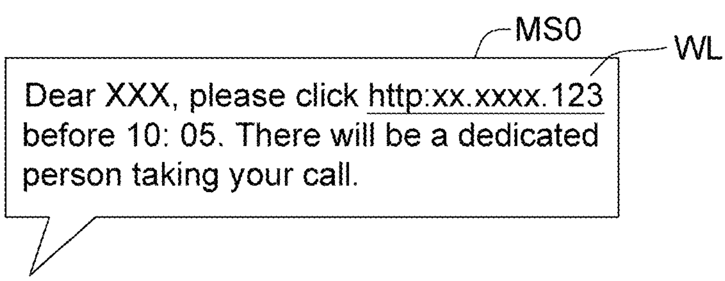
FIG. 7 exemplifies step S230.
FIG. 8 exemplifies the content of a push message.

Referring to FIG. 7, step S230 is exemplified. In step S230, the scheduling status ST of the scheduled call SCj is set as "active", a callback time limit ET is set, and a pin code PC is generated by the control unit 830 of the PBX device 800.

As indicated in FIG. 5 and FIG. 7, the scheduling status ST of the scheduled call SCj changes from "pending" to "active", and a pin code PC is generated. The callback time limit ET is set as "10:05" based on the current time and a suitable duration of waiting time. The duration of suitable waiting time can be 3 minutes, 5 minutes or 10 minutes.

Then, the method proceeds to step S240, a json web token (JWT) code JC is generated by the control unit 830 of the PBX device 800 according to the pin code PC, the callback time limit ET and the push token PT.

Next, the method proceeds to step S250, a push message MS0 is generated by the control unit 830 of the PBX device 800. The push message MS0 contains the JWT code JC and a URL WL.

Then, the method proceeds to step S260, the push message MS0 is pushed to the user device 100 by the control unit 830 of the PBX device 800. Referring to FIG. 8, the content of a push message MS0 is exemplified. After receiving the push message MS0 indicated in FIG. 8, the user can call back by clicking URL WL of the push message MS0 within the callback time limit ET and will be directly connected to the service extension 700*i* which the user originally wants to call. If the user does not call back before the callback time limit ET, the URL WL of the push message MS0 will fail, and the user needs to dial another internet call.

Figure 9:
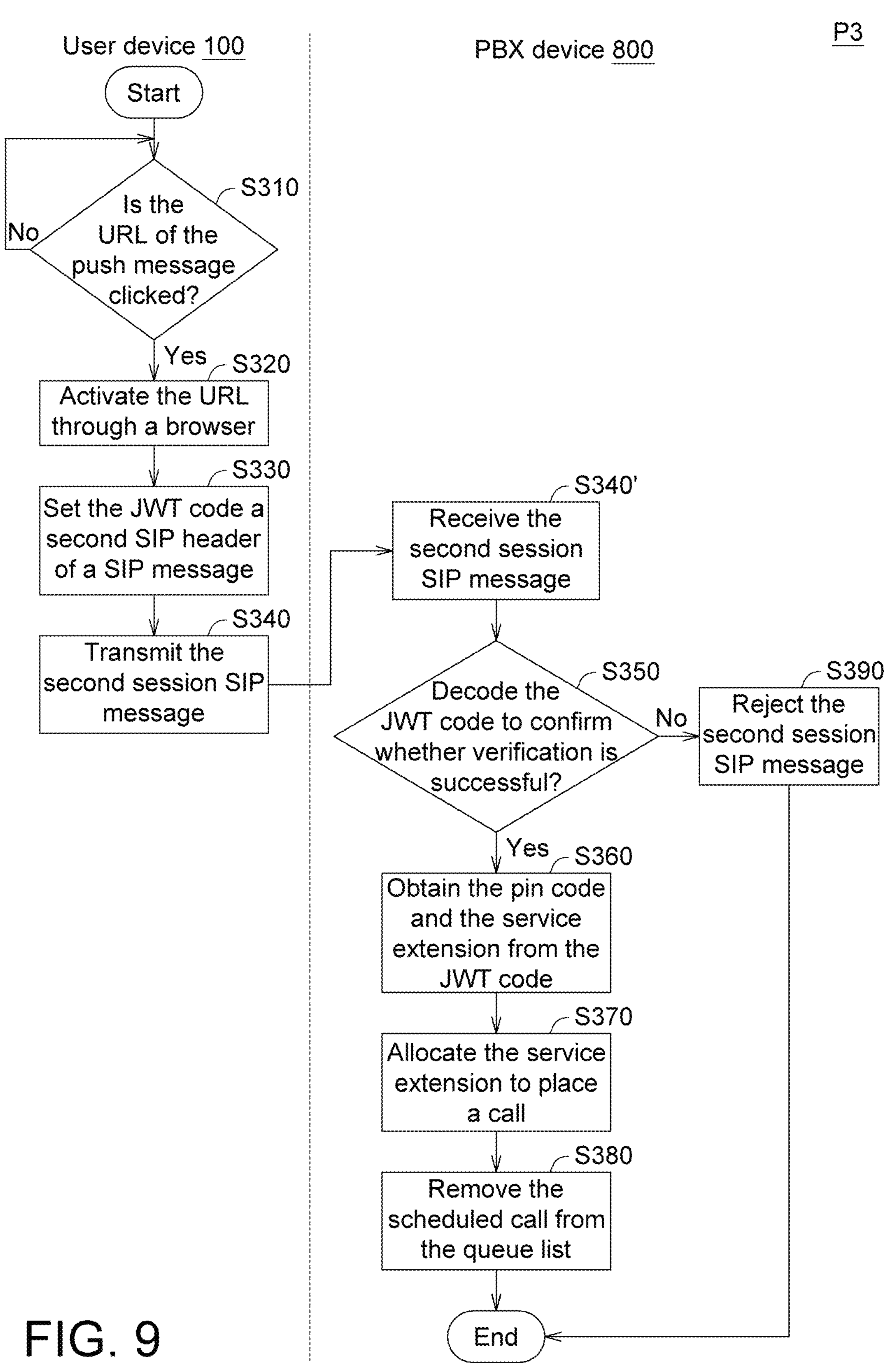
FIG. 9 is a flowchart of a callback procedure according to an embodiment of the present disclosure.

Referring to FIG. 9, a flowchart of a callback procedure P3 according to an embodiment of the present disclosure is shown. The callback procedure P3 includes step S310 to step S390. In step S310, whether the URL WL of the push message MS0 is clicked is determined. If the URL WL is clicked, the method proceeds to step S320.

in step S320, the URL WL is activated through a browser by the processing unit 110 of the user device 100.

Figures 10, 11:
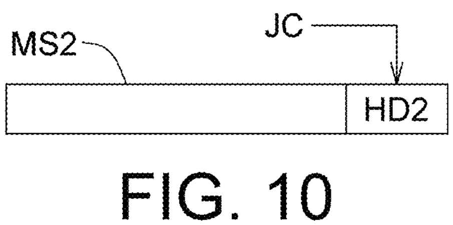
FIG. 10 exemplifies step S330.
FIG. 11 exemplifies step S380

Referring to FIG. 10, step S330 is exemplified. In step S330, the JWT code JC is set into a second SIP header HD2 of a second session initiation protocol message (SIP message) MS2 by the processing unit 110 of the user device 100. When the user clicks the URL WL, the JWT code JC will be set into the second SIP header HD2 of the second session SIP message MS2.

Then, the method proceeds to step S340, the second session SIP message MS2 is transmitted to the PBX device 800 through the network 900 by the transmission unit 120 of the user device 100.

Next, the method proceeds to step S340', the second session SIP message MS2 is received by the communication unit 810 of the PBX device 800 through the network 900.

Then, the method proceeds to step S350, the JWT code JC is decoded by the control unit 830 of the PBX device 800 to confirm whether verification is successful. If the JWT code JC cannot pass the verification, the method proceeds to step S390; if the JWT code JC passes the verification, the method proceeds to step S360.

In step S390, the second session SIP message MS2 is rejected by the control unit 830 of the PBX device 800, and the call is hanged up.

In step S360, the pin code PC and the service extension 700*i* are obtained from the JWT code JC by the control unit 830 of the PBX device 800. For instance, after the JWT code JC of FIG. 7 is decoded, the "sddffw" pin code PC and the "3423" service extension 700*i* can be obtained.

Next, the method proceeds to step S370, the service extension 700*i* is allocated to place a call by the control unit 830 of the PBX device 800. For instance, based on the "3423" service extension 700*i* obtained after decoding, the control unit 830 directly transmits the call to the "3423" service extension 700*i*.

Referring to FIG. 11, step S380 is exemplified. In step S380, the scheduled call SCj (illustrated in FIG. 7) is removed from the queue list QTB by the control unit 830 of the PBX device 800. As indicated in FIG. 11, if the user has completed the call with the service extension 700*i* or the user fails to call back before the callback time limit ET, the scheduled call SCj (illustrated in FIG. 7) of the queue list QTB will be automatically erased.

According to the above embodiments, after making an internet call through the network 900, the user does not need to wait on-line if the customer service is busy. Instead, the user can immediately hang up the call and attend other business. The user only needs to call back after receiving a push message MS0, and will be immediately connected to the customer service, hence saving a large amount of waiting time.

The characteristics of some implementations or examples for implementing the present disclosure are disclosed above. Some specific examples describing the elements and disposition of the present disclosure (such as the values and names) are provided to simply or exemplify some implementations of the present disclosure. The elements and configuration are for exemplary purpose only, not for limiting the present disclosure. Moreover, the designations and/or alphabets can be repeated in some implementations of the present disclosure for the purpose of clarity and simplicity without specifying the relationships between various implementations and/or configurations of the present disclosure.

While the invention has been described by way of example and in terms of the preferred embodiment(s), it is to be understood that the invention is not limited thereto. Based on the technical feature points embodiments of the present invention, a person ordinarily skilled in the art will be able to make various modifications and similar arrangements and procedures without breaching the spirit and scope of protection of the invention. Therefore, the scope of protection of the present invention should be accorded with what is defined in the appended claims.

What is claimed is:

1. A customer service scheduling method for internet call, comprising:

a call accessing procedure, comprising:

setting a push token into a first session initiation protocol header (SIP header) of a first session initiation protocol message (SIP message) by a user device;

transmitting the first session SIP message to a private branch exchange device (PBX device) by the user device to place a call;

directing the call to a service extension by the PBX device when receiving the first session SIP message;

determining whether the service extension is busy by the PBX device; and if the service extension is busy, recording the push token and the service extension to a scheduled call of a queue list, and recording a scheduling status of the scheduled call as "pending" by the PBX device.

2. The customer service scheduling method for internet call according to claim 1, wherein the call accessing procedure further comprises:

if the service extension is not busy, determining whether the service extension has already stored in the scheduled call of the queue list the PBX device; and if the service extension has already stored in the scheduled call of the queue list, recording the service extension and the push token to another scheduled call of the queue list by the PBX device.

3. The customer service scheduling method for internet call according to claim 2, further comprising an automatic pushing procedure, wherein the automatic pushing procedure comprises:

determining whether the service extension is idle by the PBX device;

if the service extension is idle, obtaining the scheduled call corresponding to the service extension and having the scheduling status of "pending" by the PBX device; and setting the scheduling status of the scheduled call as "active", setting a callback time limit, and generating a pin code by the PBX device.

4. The customer service scheduling method for internet call according to claim 3, wherein the automatic pushing procedure further comprises:

generating a json web token (JWT) code by the PBX device according to the pin code, the callback time limit and the push token;

generating, by the PBX device, a push message, which contains the JWT code and a URL; and pushing the push message to the user device by the PBX device.

5. The customer service scheduling method for internet call according to claim 4, further comprising a callback procedure, wherein the callback procedure comprises:

activating the URL through a browser by the user device, if the URL of the push message is clicked;

setting the JWT code into a second SIP header of a second session initiation protocol message (SIP message) by the user device; and transmitting the second session SIP message to the PBX device by the user device.

6. The customer service scheduling method for internet call according to claim 5, wherein the callback procedure further comprises:

receiving the second session SIP message by the PBX device;

decoding the JWT code by the PBX device to confirm whether verification is successful;

obtaining the pin code and the service extension from the JWT code by the PBX device, if the JWT code passes the verification.

7. The customer service scheduling method for internet call according to claim 6, wherein the callback procedure further comprises:

allocating the service extension to place a call by the PBX device; and removing the scheduled call from the queue list by the PBX device.

8. An internet telephone system, comprising:

a user device, comprising:

a processing unit; and a transmission unit, connected to the processing unit; and a PBX device, comprising:

a communication unit;

an interactive voice response unit (IVR), connected to the communication unit;

a control unit, connected to the communication unit and the interactive voice response unit;

a distribution unit, connected to the control unit; and at least one service extension;

wherein in a call accessing procedure, the processing unit of the user device sets a push token into a first SIP header of a first session initiation protocol message (SIP message);

the transmission unit of the user device transmits the first session SIP message to the PBX device to place a call;

when the communication unit of the PBX device receives the first session SIP message, the interactive voice response unit of the PBX device directs the call to the service extension;

the PBX device determines whether the service extension is busy; and if the service extension is busy, the control unit of the PBX device records the push token and the service extension to a scheduled call of a queue list and records a scheduling status of the scheduled call as "pending".

9. The internet telephone system according to claim 8, wherein in the call accessing procedure, if the service extension is not busy, the control unit of the PBX device determines whether the service extension has already stored in the scheduled call of the queue list; and if the service extension has already stored in the scheduled call of the queue list, the control unit of the PBX device records the service extension and the push token to another scheduled call of the queue list.

10. The internet telephone system according to claim 9, wherein in an automatic pushing procedure, the control unit of the PBX device determines whether the service extension is idle;

if the service extension is idle, the control unit of the PBX device obtains the scheduled call corresponding to the service extension and having the scheduling status of "pending"; and the control unit of the PBX device sets the scheduling status of the scheduled call as "active", sets a callback time limit, and generates a pin code.

11. The internet telephone system according to claim 10, wherein in the automatic pushing procedure, the control unit of the PBX device generates a json web token (JWT) code according to the pin code, the callback time limit and the push token;

the control unit of the PBX device generates a push message, which contains the JWT code and a URL; and the control unit of the PBX device pushes the push message to the user device.

12. The internet telephone system according to claim 11, wherein in a callback procedure, if the URL of the push message is clicked, the processing unit of the user device activates the URL through a browser;

the processing unit of the user device setts the JWT code into a second SIP header of a second session initiation protocol message (SIP message); and the transmission unit of the user device transmits the second session SIP message to the PBX device.

13. The internet telephone system according to claim 12, wherein in the callback procedure, the communication unit of the PBX device receives the second session SIP message;

the control unit of the PBX device decodes the JWT code to confirm whether verification is successful; and if the JWT code passes the verification, the control unit of the PBX device obtains the pin code and the service extension from the JWT code.

14. The internet telephone system according to claim 13, wherein in the callback procedure, the control unit of the PBX device allocates the service extension to place a call;

the control unit of the PBX device removes the scheduled call from the queue list.

15. A PBX device, comprising:

a communication unit;

an interactive voice response unit, connected to the communication unit;

a control unit, connected to the communication unit and the interactive voice response unit; and a distribution unit, connected to the control unit;

wherein in a call accessing procedure, a user device sets a push token into a first SIP header of a first session initiation protocol message (SIP message);

the user device transmits the first session SIP message to the PBX device to place a call;

when the communication unit of the PBX device receives the first session SIP message, the interactive voice response unit of the PBX device directs the call to a service extension;

the PBX device determines whether the service extension is busy; and if the service extension is busy, the control unit of the PBX device records the push token and the service extension to a scheduled call of a queue list and records a scheduling status of the scheduled call as "pending".

16. The PBX device according to claim 15, wherein in the call accessing procedure, if the service extension is not busy, the control unit of the PBX device determines whether the service extension has already stored in the scheduled call of the queue list; and if the service extension has already stored in the scheduled call of the queue list, the control unit of the PBX device records the service extension and the push token to another scheduled call of the queue list.

17. The PBX device according to claim 16, wherein in an automatic pushing procedure, the control unit of the PBX device determines whether the service extension is idle;

if the service extension is idle, the control unit of the PBX device obtains the scheduled call corresponding to the service extension and having the scheduling status of "pending"; and the control unit of the PBX device sets the scheduling status of the scheduled call as "active", sets a callback time limit, and generates a pin code.

18. The PBX device according to claim 17, wherein in the automatic pushing procedure, the control unit of the PBX device generates a json web token (JWT) code according to the pin code, the callback time limit and the push token;

the control unit of the PBX device generates a push message, which contains the JWT code and a URL; and the control unit of the PBX device pushes the push message to the user device.

19. The PBX device according to claim 18, wherein in a callback procedure, if the URL of the push message is clicked, the user device activates the URL through a browser;

the user device sets the JWT code into a second SIP header of a second session initiation protocol message (SIP message); and the transmission unit of the user device transmits the second session SIP message to the PBX device.

20. The PBX device according to claim 19, wherein in the callback procedure, the communication unit of the PBX device receives the second session SIP message;

the control unit of the PBX device decode the JWT code to confirm whether verification is successful;

if the JWT code passes the verification, the control unit of the PBX device obtains the pin code and the service extension from the JWT code; and the control unit of the PBX device allocates the service extension to place a call;

the control unit of the PBX device removes the scheduled call from the queue list.

* * * * *